United States Patent [19]
Muncy

[11] 3,741,592
[45] June 26, 1973

[54] RETENTION DEVICE
[75] Inventor: Randall E. Muncy, Springfield, Ohio
[73] Assignee: Muncy Corporation, Enon, Ohio
[22] Filed: July 29, 1970
[21] Appl. No.: 59,203

[52] U.S. Cl. .............................. 287/101, 24/261 R
[51] Int. Cl. ........................................... F16c 11/00
[58] Field of Search ...................... 85/8.8 R, 1 K; 287/DIG. 7, 100, 101; 24/261 R, 261 F, 261 CT, 261 RC, 159, 161 R; 132/48 A, 50 R

[56] References Cited
UNITED STATES PATENTS

| | | | |
|---|---|---|---|
| 1,663,854 | 3/1928 | Nief | 132/48 A |
| 1,852,931 | 4/1932 | Klavon | 132/48 A |
| 1,614,809 | 1/1927 | Sylvester | 132/48 A |
| 1,659,094 | 2/1928 | Godfrey | 85/8.8 UX |
| 424,016 | 3/1890 | Morgan | 24/261 CT |
| 3,132,396 | 5/1964 | Berman | 24/261 RC |
| 2,082,315 | 6/1937 | Williams | 85/8.8 X |
| 2,137,035 | 11/1938 | Swallow | 85/8.8 UX |
| 3,259,346 | 7/1966 | Rogers | 85/8.8 X |
| 2,586,940 | 2/1952 | Graham | 24/261 UX |

FOREIGN PATENTS OR APPLICATIONS

| | | | |
|---|---|---|---|
| 3,014 | 1856 | Great Britain | 132/50 R |

Primary Examiner—Andrew V. Kundrat
Attorney—Jerome P. Bloom

[57] ABSTRACT

A retainer featuring a spring clip which in an unlatched condition has an elongate, modified "U" shape. At its open end the legs of the clip are spring formed to be biased from one another. Intermediate their ends the legs have mating bowed portions adapted to closely embrace a body portion of a stud or other shaft-like element while their projected extremities may be brought together and releasably latched under tension. In its latched condition the clip is fixed in a plane transverse to the stud or other shaft-like article to which it mounts to serve as a holding medium for elements mounted between it and means defining a reference plane through which the stud or shaft projects.

7 Claims, 4 Drawing Figures

PATENTED JUN 26 1973 3,741,592

INVENTOR
RANDALL E. MUNCY

BY Jerome P. Bloom

ATTORNEY 3,741,592

RETENTION DEVICE

BACKGROUND OF THE INVENTION

This invention relates to retention and fastening devices, and more particularly to an improved retainer or holding device which may be applied to and used in combination with a stud or other device of shaft-like configuration to hold parts positioned on the stud or shaft to a reference surface. Though not so limited in use, it will be so described by way of illustration.

Various shaft or stud mounted retention devices have been known in the prior art. These include pins, snap rings, clamps, etc. While suited for use in many applications, most of the prior art devices have proven to have inherent disadvantages, particularly where they are subjected to conditions of vibration and/or intermittent or excessive thrust. Those which have more dependability in use are either relatively expensive to fabricate or complex as to their application and removal. More importantly, the devices of the prior art of the character above described do not readily lend themselves to positive function and manipulation. In contrast, the invention devices are not only economical to fabricate and easy to apply but they may be readily and positively manipulated.

SUMMARY OF THE INVENTION

Embodiments of the present invention feature a simple but unique fastener and retention device in the form of a one-piece spring clip made, preferably, of rectangular wire stock. The clip is designed to have an elongated, stretched out, modified U-shape. Intermediate their ends, the legs of the "U" have opposite outwardly bowed portions adapted to embrace a portion of a shaft-like body while their projected ends are normally biased to separate. The projected ends of the legs have integrally formed latch portions which may be releasably interengaged to place the legs under tension and to fix the clip in a plane transversely of and in a projected relation to the shaft-like body to which it mounts. So fixed, the clip may releasably contain shaft mounted elements to a reference surface.

In a preferred embodiment, the shaft-like body portion is peripherally grooved to precisely nest the otwardly bowed portions of the clip legs, thereby to positively inhibit displacement of the clip in a sense axially of the element to which it mounts.

It will be seen that in application of the clip, particularly in cooperation with a stud or like member such as described, there is produced a retention assembly which is more positive in function and more resistant to deterioration under the influence of vibration and thrust than would be the case where a snap ring, for example, or similar element, is used.

It is therefore a primary object of the invention to provide an improved retention device for holding shaft or stud mounted elements to a reference surface which is economical to fabricate, more efficient and satisfactory in use, and adaptable to a wide variety of applications.

Another object of the invention is to provide a positive acting retention element for use on a stud or other shaft-like element which is highly resistant to displacement or failure under the influence of substantial thrust and/or vibration.

An additional object of the invention is to provide a retention device of spring wire which is particularly designed to facilitate the positive engagement thereof in a position transverse to a shaft-like body.

Another object of the invention is to provide a clip-type retainer formed of rectangular wire stock characterized by means enabling its fast and easy installation and removal.

An additional object of the invention is to provide a clip retainer positive in its action and having a mount strongly resisting displacement.

Still another object of the invention is to provide a clip retainer, in an assembly for holding elements to a reference surface, utilizing a latch principle to apply thereto a locking stress lending security in its use.

A further object of the invention is to provide a retention assembly comprising the combination of a shaft-like body having therein a circumferential groove and a specially formed spring clip adapted to be latched in an embracing relation to the groovedportion of the body whereby to project laterally, fixed in a plane transverse to said body.

Another object of the invention is to provide a retention device possessing the advantageous structural features, the inherent meritorious characteristics and the means and mode of use herein described.

With the above and other incidental objects in view, as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings, wherein is shown one but not necessarily the only form of embodiment of the invention, FIG. 1 is a fragmentary top view of an assembly showing clip retainer means in accordance with the invention in use;

Like parts are indicated by similar characters of reference throughout the several views.

Figure 2:
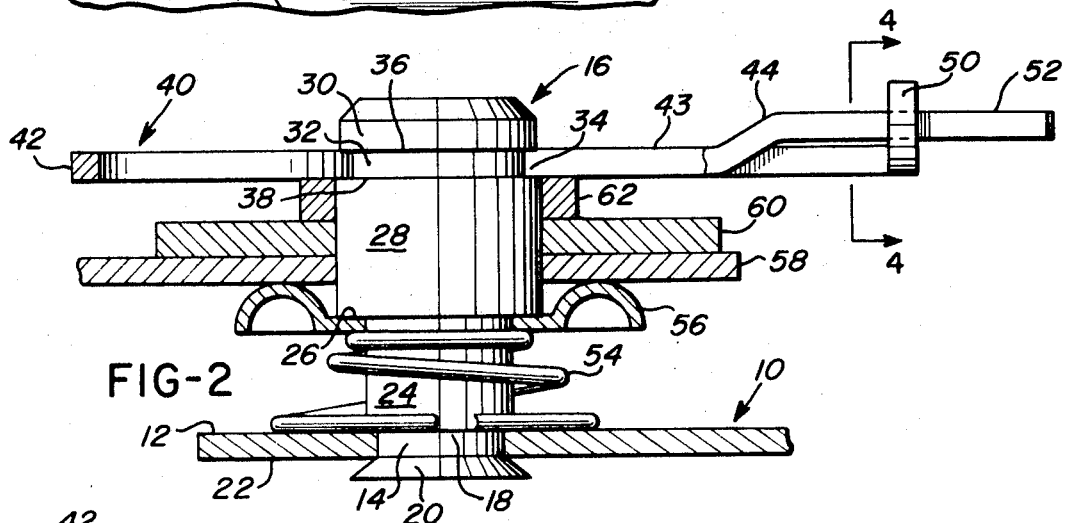
FIG. 2 is a sectional view taken substantially on the irregularly formed line 2—2 of FIG. 1.

The assembly of the drawings shows a plate 10 defining a reference surface 12 through which is projected a reduced end portion 14 of a stud 16. A shoulder 18 formed on the body of the stud 16 by the reduction of the end porion 14 is clamped in a fixed abutting relation to the reference surface 12 by an upset of the projected extremity 20 of the end portion 14 to engage the far side 22 of the plate 10. As seen in FIG. 2, the shaft-like body of the stud 16 is so fixed to project perpendicular to the reference surface 12.

The stud 16 has a generally cylindrical, stepped configuration. Beyond the surface 12 and the shoulder 18, there is defined on the stud an axially extended body portion 24 of uniform diameter. The body portion 24 terminates at a radially projected annular shoulder 26 defining one end of a relatively expanded stud portion 28. At its end remote from the surface 12, the stud has formed thereon a head 30 which is shallow in depth, in an axial sense, and has a diameter slightly smaller than that of the stud portion 28. The head 30 is separated from the portion 28 by a short length stud body portion 32. The latter has a diameter less than that of the head 30 but slightly greater than that of the body portion 24.

The configuration of the stud so defined creates, immediately adjacent the head 30, a circumferential recess 34.

The axial limits of recess 34 are defined by the annular shoulders 36 and 38 which define the adjacent limits of the head 30 and the expanded body portion 28. Accordingly, since shoulders 36 and 38 lie in planes perpendicular to the longitudinal axis of the stud 16, the recess 34 has a rectangular cross-section, the benefits of which will soon become obvious.

Figure 1:
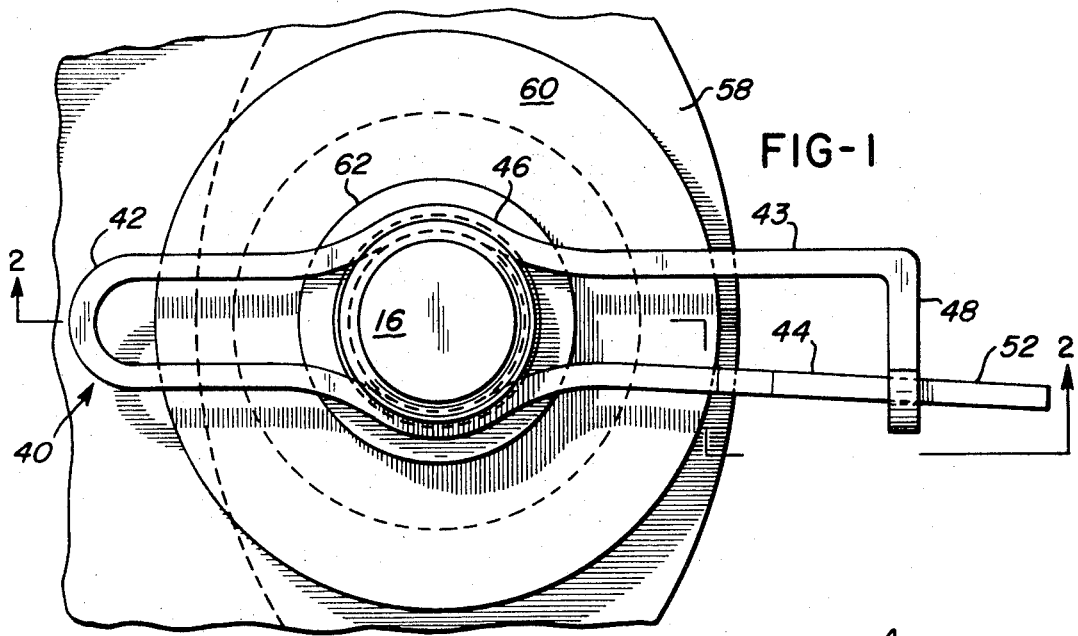

As seen in FIGS. 1 and 2, locked to the shaft-like body of stud 16, in the recess 34, and projecting transversely thereof in a sense perpendicular thereto, is a unique clip retainer 40.

Figure 3:
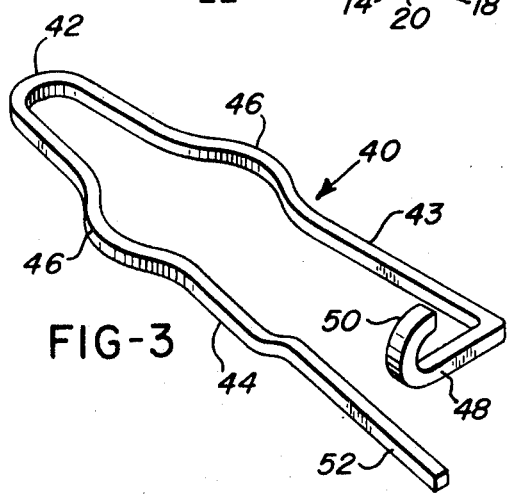
FIG. 3 is a perspective view of the clip retainer.
Figure 4:
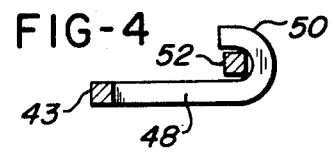
FIG. 4 is a sectional view taken on line 4—4 of FIG. 2.

The clip 40 is formed of a length of spring wire stock which is square in cross-section. Its cross-sectional dimension is such that it can firmly nest in the recess 34 of stud 16 without appreciable play. As is self-evident from FIG. 3 of the drawings, in forming the clip the length of wire stock is bent on itself to provide it with an elongate, modified U-shape including an arcuate closed end or base portion 42 and elongate, slightly divergent, leg portions 43 and 44. Intermediate their ends and more closely adjacent the base portion 42, the leg portions have formed therein opposite, identical, outwardly bowed sections 46. The latter are formed on a generally uniform radius complementary to that on which the stud body portion 32 has been formed. The one leg portion 43 has its projected end portion 48 bent at right angles thereto, inwardly of the clip, in the general plane thereof and towards the leg portion 44. As seen in FIGS. 3 and 4, the projected extremity 50 of the leg portion 48 is bent upwardly and back to create a hook which opens away from the leg portion 44. The projected extremity 52 of the latter is not bent in the direction of leg portion 43 but rather offset upwardly of the general plane of the clip to lie in a plane within the area of the hook 50. Thus, leg portion 43 ends up shorter than leg portion 44 and, as will be seen, their projected extremities provide latch means which are adapted to interengage and place the clip under tension.

Referring to FIG. 2, the clip 40 is there shown in use to retain an assembly of elements on the body of stud 16 and in a predetermined relation to the reference surface 12 of plate 10. Included on the stud, in fragmentary form, are portions of elements which may, for example, represent segments of components used in a control assembly for an automobile window. For purposes of illustrating the present invention, however, one need only consider their relation to the stud 16 and between the clip 40 and plate 10. Thus, one may observe about the stud portion 24 a coiled compression spring 54 seated at one end to the plate 10 and having its other end in biasing engagement to an annular washer 56. The latter is urged to seat its inner periphery to stud shoulder 26 while its outer periphery, projected in a semi-circular contour, bears against one end face of a sandwich assembly of plates 58 and 60 and an annular flat washer 62. The latter abuts and is contained by the clip 40. It is noted the elements 58, 60 and 62 have projected therethrough and commonly bear on the stud body portion 28.

The clip 40 is shown in FIG. 3 in its unlatched position. To apply it to the stud 16, its legs 43 and 44 may be slightly spread, against the bias thereon, to encompass the stud body portion 32 with their outwardly bowed portions 46. Due to the fact the clip is formed of wire stock complementary in shape to the cross-section of recess 34 and the bowed portions 46 are uniformly arcuate, on release of the clip legs the bowed portions may firmly and frictionally nest in the recess 34 and on the stud body portion 32. The projected extremities 48 and 52 of the clip leg portions may then be brought together and the portion 52 slid over and into the hook 50. As this is done, the clip legs are placed under a latching tension to dispose firmly at right angles to stud 16 and inhibited, positively, from axial displacement on the stud. This establishes the elements 54, 56, 58, 60 and 62 in their required position and under the necessary degree of bias which their application dictates.

Since the invention clip is easily and positively manipulated and applied, particularly in the form and combination or assembly illustrated, it is substantially guaranteed that once applied it will resist fully distortion or displacement under the influence of vibration and thrust. The tension under which the clip is placed in latching contributes greatly to its efficiency and effectiveness.

Of course, it will be readily apparent that the invention clip can have a multitude of applications and that it will function equally well in a combination with any shaft-like object to which it can mount. For example, a groove such as the groove 34 could be cut in any portion of a simple shaft or any shaft-like body wherein a retainer may be desired and the clip 40 applied as described to hold an element or stack of elements to a reference surface in the precisely desired fashion. Of course the use of a clip of square cut cross-section in conjunction with a complementary cut groove is optimal.

Thus, the invention provides a simple, economical, easily manipulated but positive solution to the problems of the pertinent prior art.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

Having thus described my invention, I claim:

1. In an assembly wherein a stud shaft or the like receives parts over an end thereof in telescoping relation, a peripheral surface of said shaft adjacent said one end having groove means formed therein, a positively acting retainer clip having a hair pin-like configuration presenting legs which intermediate their ends are adapted to fit over the shaft and are received in said groove means and which at their free extremities are adapted to be brought together and to interlock with one another to enforce an interfitting relation of said legs intermediate their ends with said groove means, intermediate portions of said legs having a configuration complementary to the cross sectional shape of the shaft and engaging in said groove means to inhibit relative longitudinal movement of the clip transversely of the shaft axis in an interlocked position of said extremities, the clip having a cross sectional configuration substantially corresponding to that of said groove means and substantially filling said groove means, said retainer clip being made of spring material substantially uniform in cross section throughout its length, one of said legs being projected relatively to the other, the shorter leg having a portion bent out of the plane thereof toward which the longer leg may be deflected and interengaged with for a latch-like connection, the natural resilience of the legs being utilized yieldingly to maintain such connection, the bent out portion of the shorter leg being turned in plural senses to define a hook offset toward said longer leg and the longer leg having a portion offset for more facile engagement with and release from said hook.

2. A retainer clip according to claim 1, wherein said clip is made of spring material uniform in cross section throughout its length, said leg extremities being spaced apart and yieldingly resisting movement in an approaching sense.

3. A retainer clip according to claim 2, wherein said spring material is square in cross section, the groove means receiving the clip being of conforming configuration.

4. A retainer clip for use in conjunction with a stud presenting a shaft-like body including at least one circumferential groove, said clip comprising a spring element bent in a U-shape to have elongate slightly divergent leg portions extending from an arcuate closed end, said leg portions being in a common transverse plane bowed in complementary fashion intermediate their ends to engage with and form about said body within said groove and having offset free extremities formed to interengage and resiliently lock together, one of said legs having its projected extremity including an end portion bent towards the other and offset to form a hook opening away from the other leg and the other of said legs having its extremity including an end portion offset out of said common plane but continued in substantially the same direction as its preceding portion, said leg portions having a cross section at their bowed portions substantially conforming to that of the said circumferential groove in said shaft-like body.

5. A retainer clip comprising a spring element bent in a U-shape to have elongate slightly divergent leg portions extending from an arcuate closed end of the clip, said leg portions being in a common transverse plane bowed in complementary fashion intermediate their ends to engage about a shaft-like portion of a body, an outer open end of the clip presenting extremities of said leg portions adapted to be moved together in a relative approaching sense to place the clip under tension, said extremities being differentially formed to define interengageable latching elements which when interengaged maintain a tensioned or closed condition of the clip, one of said extremities being bent into a hook-like configuration and the other being bent to lie in a plane offset from but substantially parallel to said common plane and being manipulative into and out of interengagement with said extremity of hook-like configuration.

6. A retainer clip according to claim 5, wherein said one extremity in being bent into a hook-like configuration is turned toward the other extremity substantially in said common plane and is then deformed out of said common plane in a substantially intersecting relation to the offset plane of said other extremity.

7. A retainer clip according to claim 6, wherein said other extremity includes an offset portion located opposite said hook-like configuration of the said one extremity and in relative projecting relation thereto.

* * * * *